(12) United States Patent
Nguyen et al.

(10) Patent No.: US 11,441,406 B2
(45) Date of Patent: Sep. 13, 2022

(54) FORMING FRAC PACKS IN HIGH PERMEABILITY FORMATIONS

(71) Applicant: Halliburton Energy Services, Inc., Houston, TX (US)

(72) Inventors: Philip D. Nguyen, Houston, TX (US); Michael W. Sanders, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/275,966

(22) PCT Filed: Dec. 21, 2018

(86) PCT No.: PCT/US2018/067321
§ 371 (c)(1),
(2) Date: Mar. 12, 2021

(87) PCT Pub. No.: WO2020/131122
PCT Pub. Date: Jun. 25, 2020

(65) Prior Publication Data
US 2022/0034212 A1 Feb. 3, 2022

(51) Int. Cl.
*E21B 43/267* (2006.01)
*C09K 8/62* (2006.01)
*C09K 8/80* (2006.01)

(52) U.S. Cl.
CPC .............. *E21B 43/267* (2013.01); *C09K 8/62* (2013.01); *C09K 8/80* (2013.01); *C09K 8/805* (2013.01)

(58) Field of Classification Search
None
See application file for complete search history.

(56) References Cited

U.S. PATENT DOCUMENTS

| 6,860,328 B2 | 3/2005 | Gonzalez et al. |
| 6,938,693 B2 | 9/2005 | Boney et al. |
| 7,210,528 B1 | 5/2007 | Brannon et al. |

(Continued)

FOREIGN PATENT DOCUMENTS

| EP | 2469020 A1 | 6/2012 |
| WO | 2011081549 A1 | 7/2011 |

OTHER PUBLICATIONS

International Search Report and Written Opinion issued in PCT App. No. PCT/US2018/067321 dated Sep. 20, 2019.

*Primary Examiner* — Andrew Sue-Ako
(74) *Attorney, Agent, or Firm* — McAfee & Taft (57) ABSTRACT

A method of treating a highly permeable subterranean formation that is penetrated by a wellbore to form a frac pack in the formation adjacent to a desired wellbore interval is provided. The method comprises (a) injecting a first high efficiency fracturing fluid into the formation to form a fracture in the formation that propagates from a near-wellbore region of the formation into a far-field region of the formation. Thereafter, high strength proppant is placed in a portion of the fracture in the near-wellbore region of the formation, and low strength proppant is placed in a portion of the fracture near the far-field region of the formation using low viscosity fluids. Subsequently, a high strength proppant is squeezed into a portion of the fracture in the near-wellbore region of the formation to assure that the fracture is completely packed.

19 Claims, 3 Drawing Sheets

(56) References Cited

U.S. PATENT DOCUMENTS

| | | | |
|---|---|---|---|
| 7,472,751 B2 | 1/2009 | Brannon et al. | |
| 8,082,992 B2 | 12/2011 | Todd et al. | |
| 9,328,600 B2 | 5/2016 | Kaminsky et al. | |
| 9,790,422 B2 | 10/2017 | McDaniel | |
| 10,100,626 B2 | 10/2018 | Martysevich et al. | |
| 11,313,214 B2 * | 4/2022 | Nguyen | E21B 43/267 |
| 2013/0014946 A1 * | 1/2013 | Makarychev-Mikhailov | C09K 8/62 166/308.1 |
| 2015/0315892 A1 * | 11/2015 | McDaniel | C09K 8/80 166/280.2 |
| 2017/0190959 A1 * | 7/2017 | Reddy | C09K 8/62 |
| 2018/0016489 A1 | 1/2018 | Suzart et al. | |
| 2018/0030333 A1 | 2/2018 | Nguyen et al. | |
| 2018/0051203 A1 | 2/2018 | Nguyen et al. | |
| 2018/0066179 A1 | 3/2018 | Nguyen et al. | |
| 2021/0172308 A1 * | 6/2021 | Nguyen | C09K 8/80 |

\* cited by examiner

FORMING FRAC PACKS IN HIGH PERMEABILITY FORMATIONS

BACKGROUND

In order to efficiently produce hydrocarbons from a subterranean formation, the formation should be sufficiently conductive in order to allow the hydrocarbons to flow to the wellbore. Various treatments for increasing the conductivity of a subterranean formation have been developed.

One technique for increasing the conductivity of a subterranean formation and thereby stimulating production of hydrocarbons from the formation is hydraulic fracturing. Hydraulic fracturing generally involves pumping one or more fracturing fluids into the formation at a sufficient hydraulic pressure to create or enhance one or more fractures in the formation. Typically, a pad fluid that does not contain any proppant is first injected into the formation to initially fracture the formation. Following injection of the pad fracturing fluid, a fracturing fluid that includes a proppant (a "proppant slurry") is injected into the formation. The proppant slurry deposits the proppant particulates in the fracture in order to prevent the fracture from fully closing once the hydraulic pressure on the fluid is released and the fracturing operation is complete. The fracturing fluids are either retained in the fracture and produced back to the well with production fluids, or leak off into the formation outside of the fracture. The resulting "propped fracture" provides a conductive channel through which fluids in the formation can flow to the wellbore.

Certain offshore reservoirs and other types of hydrocarbon-containing subterranean formations (for example, sandstone formations) tend to be weakly consolidated and have porous matrices, high permeabilities and relatively high clay contents. As a result, due to drag forces caused by production fluid flow rates, formation sand and fines can migrate through the porous matrix and into the wellbore, which can erode and damage equipment and decrease production. As a result, various methods to control sand production have been developed.

One method for sand control is gravel packing. In a gravel-pack operation, a sand screen is placed in the wellbore, and the annulus between the screen and the wellbore wall is packed with gravel that has a size small enough to prevent the passage of formation sand and fines yet large enough to be retained by the screen. The gravel can be formed of a natural or synthetic material.

An alternative method for sand control is frac packing. In a frac pack operation, a sand screen is first placed in the wellbore adjacent to the formation. Once the sand screen is in place, two operations are simultaneously carried out, namely, the formation is hydraulically fractured and a proppant pack or "frac pack" is formed in the fracture. In addition, proppant is packed in annulus between the sand screen and the wellbore wall. For example, the fracture is created and the proppant is placed (both to form the propped fracture and pack the annulus between the sand screen and the wellbore wall) using a high viscosity fluid.

The large propped surface area created by a frac pack allows production fluids to bypass any near wellbore damage and reduces fluid flow velocity in the near-wellbore area thereby reducing drag forces. The reduction of drag forces mitigates migration of formation sand and fines with production fluids into the wellbore. The fracture itself also helps improve hydrocarbon flow and increase production.

Frac packs can be particularly effective in highly permeable, weakly consolidated formations such as offshore reservoirs. However, like any type of well treatment operation, the effectiveness of a frac pack treatment depends in part on how the treatment is carried out.

In a frac pack operation, it is important to prevent the formation of channels or voids in the frac pack. It is also important for the annulus between the sand screen and the wellbore wall to be completely packed. The existence of channels or voids in the frac pack and/or incomplete packing of the annulus between the sand screen and the wellbore wall may prevent the frac pack from fully preventing formation sand and fines from migrating into the wellbore. Also, potential problems can be caused by gels formed to increase the viscosity of the fracturing fluid. For example, cross-linked gels tend to leave behind problematic gel residue. Also, with a high viscosity fluid, sand tends to settle on the low side of the fracture in the far-field region of the formation which creates a void above the settled sand. Unfortunately, the formation will not always slough in to fill the void. The void can allow sand and formation sands to pass through the frac pack to the wellbore.

There is a need for improved frac packing techniques, particularly for use in offshore reservoirs and other unconsolidated and highly permeable formations.

BRIEF DESCRIPTION OF THE DRAWINGS

The drawings included with this application illustrate certain aspects of the embodiments described herein. However, the drawings should not be viewed as exclusive embodiments. The subject matter disclosed herein is capable of considerable modifications, alterations, combinations, and equivalents in form and function, as will be evident to those skilled in the art with the benefit of this disclosure.

The illustrated figures are only exemplary and are not intended to assert or imply any limitation with regard to the environment, architecture, design, or process in which different examples may be implemented.

DETAILED DESCRIPTION

The present disclosure may be understood more readily by reference to this detailed description as well as to the examples included herein. For simplicity and clarity of illustration, where appropriate, reference numerals may be repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures, and components have not been described in detail so as not to obscure the related relevant feature being described. Also, the description is not to be considered as limiting the scope of the examples described herein. The drawings are not necessarily to scale and the proportions of certain parts may have been exaggerated to better illustrate details and features of the present disclosure.

As used herein and in the appended claims, the following terms and phrases have the corresponding definitions set forth below.

The term "highly permeable subterranean formation" means a formation having a permeability of at least about 1.0 millidarcies (mD), as determined by actual core flow measurements, field production or logging, or other well testing. One method to determine the subterranean formation permeability includes The American Petroleum Institute Recommended Practice 40, "Recommended Practices for Core Analysis," Second Edition, February 1998.

The term "wellbore" means a borehole extending from the surface into the ground.

The term "frac pack" means a packing of particulate material in a fracture formed by the simultaneous hydraulic fracturing of a subterranean formation to form or expand a fracture, and placement of particulate material in the fracture.

The term "desired wellbore interval" means an interval of the wellbore that is adjacent to the portion of the subterranean formation in which the frac pack is to be formed.

Unless stated otherwise, the term "fracture" means any type of fracture, including the primary fracture of a fracture network.

The term "primary fracture" means the primary (dominant) fracture of a fracture network.

Unless stated otherwise, the phrase "to form a fracture in the formation" means to form a new fracture, or to expand an existing fracture in some dimension.

The term "fracture gradient" means a factor that can be used to determine a desired formation fracturing pressure as a function of well depth in units of pounds per square inch per foot (psi/ft.). For example, a fracture gradient of 0.75 psi/ft. in a well with a true vertical depth of 10,000 feet would predict a fracturing pressure of 7,500 psi.

The term "near-wellbore region" of a formation means a region of the formation that is no greater than 10 meters (m) from the wellbore.

The term "limited near-wellbore region" of a formation means a region of the formation that is no greater than 3 m from the wellbore.

The term "far-field region" of a formation means a region of the formation that is greater than 10 m from the wellbore.

The term "expanded far-field region" of a formation means a region of the formation that is greater than 3 m from the wellbore.

The term "high efficiency fracturing fluid" means a fracturing fluid that that has a minimum leak off. A "minimum leak off" means that at least 50% of the fracturing fluid is retained in a fracture into which the fracturing fluid is injected.

The term "low viscosity fracturing fluid" means a fracturing fluid that has a viscosity of no greater than 40 centipoises.

The term "proppant" means a plurality of proppant particulates.

The term "high strength proppant" means a proppant having a crush strength of at least 4,000 psi.

The term "low strength proppant" means a proppant having a crush strength of less than 4000 psi.

The term "pad fracturing fluid" means a fracturing fluid that initiates the generation of a fracture in the formation and does not include primary proppant particulates.

The tem' "proppant slurry" means a fracturing fluid that includes proppant particulates.

The term "sand screen frac pack" means a frac pack formed in a subterranean formation adjacent to a desired wellbore interval that has a sand screen installed therein.

The term "screen fracturing fluid" means a fracturing fluid that is used to place proppant in the annulus between the outside surface of a sand screen and the wellbore wall.

The term "screenless frac pack" means a frac pack formed in a subterranean formation adjacent to a desired wellbore interval that does not have a sand screen installed therein.

The term "access conduit" refers to a passageway that provides fluid communication between the wellbore and the subterranean formation.

The term "slickwater fluid" means an aqueous fluid that includes a friction reducing agent and has a viscosity of no greater than 40 centipoises.

The phrase "coated with a consolidating agent" means partially coated or fully coated with the consolidating agent. Any portion of the proppant particulates as a whole may be coated with a consolidating agent. The term "coating" and the like does not imply any particular degree of coating on the proppant particulates. In particular, the terms "coat" or "coating" do not imply 100% coverage by the coating on the particulates.

The term "cased wellbore" means a wellbore that is cased, or that includes a liner, in the desired wellbore interval.

The term "open hole wellbore" means a wellbore that is not cased, and that does not include a liner, in the desired wellbore interval.

The term "tip screen out" means a condition that occurs when a proppant slurry approaches the leading edge (or tip) of fracture, and the base fluid of the fracturing fluid leaks off into the formation, causing the proppant slurry to dehydrate and a proppant bridge to be formed at the tip of the fracture. The proppant bridge stops the propagation of the fracture and keeps proppant from moving out of the fracture.

Whenever a range is disclosed herein, the range includes independently and separately every member of the range extending between any two numbers enumerated within the range. Furthermore, the lowest and highest numbers of any range shall be understood to be included within the range set forth.

Unless otherwise specified, any use of any form of the terms "connect," "engage," "couple," "attach," or any other term describing an interaction between elements is not meant to limit the interaction to direct interaction between the elements and may also include indirect interaction between the elements described.

The terms "including" and "comprising" are used in an open-ended fashion, and thus should be interpreted to mean "including, but not limited to."

Unless otherwise indicated, as used throughout this document, "or" does not require mutual exclusivity.

The terms "uphole" and "downhole" may be used to refer to the location of various components relative to the bottom of a well. For example, a first component described as uphole from a second component may be further away from the bottom of the well than the second component. Similarly, a first component described as being downhole from a second component may be located closer to the bottom of the well than the second component.

The present disclosure provides a method of treating a highly permeable subterranean formation that is penetrated by a wellbore to form a frac pack in the formation, where the frac pack may be adjacent to a desired wellbore interval. The method comprises:

(a) injecting a first fracturing fluid into the formation at a pressure sufficient to form a fracture in the formation that propagates from a near-wellbore region of the formation into a far-field region of the formation, wherein the first fracturing fluid is a high efficiency fracturing fluid;

(b) following step (a), injecting a second fracturing fluid that includes a high strength proppant into the formation at a pressure sufficient to keep the fracture open and place high strength proppant in a portion of the fracture in a near-wellbore region of the formation, wherein the second fracturing fluid is a low viscosity fracturing fluid;

(c) following step (b), injecting a third fracturing fluid that includes a low strength proppant into the formation at a pressure sufficient to keep the fracture open and place low strength proppant in a portion of the fracture in a far-field region of the formation, wherein the third fracturing fluid is a low viscosity fracturing fluid; and (d) following step (c), injecting a fourth fracturing fluid that includes a high strength proppant into the formation at a pressure sufficient to keep the fracture open and squeeze high strength proppant into the portion of the fracture into which high strength proppant was placed by the second fracturing fluid, wherein the fourth fracturing fluid is a low viscosity fracturing fluid.

As defined above, a highly permeable subterranean formation means a formation wherein the permeability is at least about 1.0 millidarcies (mD). For example, the subterranean formation can have a permeability ranging from a lower limit of about 1.0 mD to an upper limit of about 1000 mD. For example, the subterranean formation can have a permeability ranging from a lower limit of about 1.0 mD to an upper limit of about 50 mD.

For example, the wellbore can have an annular wall and an average diameter in the desired wellbore interval. For example, the wellbore can have an annular wall and an average diameter over the entire length of the wellbore.

The various fracturing fluids (e.g., the first fracturing fluid, second fracturing fluid, etc.) injected into the formation in connection with the disclosed methods can be injected into the formation in stages. Also, the methods disclosed herein can include the step of setting one or more packers in the wellbore. For example, a packer can be set in the wellbore below the desired wellbore interval.

For example, the first fracturing fluid can be injected into the formation at a pressure sufficient to form a single fracture in the formation that propagates from a near-wellbore region of the formation into a far-field region of the formation. The fracture has a sufficient fracture width to allow high strength proppant and low strength proppant to be placed therein by subsequent fracturing fluids in accordance with the methods disclosed herein. For example, the fracture formed by the first fracturing fluid can be a planar, bi-wing fracture. The fracture can have a length of 50 feet or more.

For example, the first fracturing fluid can be injected into the formation at a pressure sufficient to form a fracture network having a single primary fracture in the formation that propagates from a near-wellbore region of the formation into a far-field region of the formation. Formation of more than one fracture network and more than one primary fracture by the first fracturing fluid can cause a premature screen out and incomplete packing of the fracture at issue.

The first fracturing fluid is a high efficiency fracturing fluid. As stated above, a high efficiency fracturing fluid is a fracturing fluid that that has a minimum leak off. A "minimum leak off" means that at least 50% of the fracturing fluid is retained in the fracture. The portion of the fracturing fluid that is not retained in the fracture leaks off into the pore spaces of the rock or other parts of the formation outside the fracture. The portion of the fracturing fluid that is retained by the fracture is ultimately produced back to the well with production fluids. For example, the first fracturing fluid can be a pad fracturing fluid.

In accordance with the disclosed methods, the second fracturing fluid enters the fracture, keeps the fracture open and places high strength proppant in a portion of the fracture in a near-wellbore region of the formation. The high strength proppant placed in a portion of the fracture in the near-wellbore region of the formation can withstand the high fracture closure stresses that are typically applied to the proppant in this area, thereby allowing the frac pack to maintain a high conductivity. Low strength proppant placed in the same area might not be able to withstand the high fracture closure stresses and might end up being crushed, thereby creating a choking effect as production fluids flow through the crushed proppant pack into the wellbore.

In accordance with the disclosed methods, the third fracturing fluid enters the fracture, keeps the fracture open and places low strength proppant in a portion of the fracture in a far-field region of the formation. For example, the third fracturing fluid places low strength proppant in the fracture near the high strength proppant placed in the fracture by the second fracturing fluid and continuing to the end of the fracture in the far-field region of the formation. Depending on how much of the fracture the high strength proppant fills, it is possible for low strength proppant to also be placed by the third fracturing fluid in a portion of the fracture in a near-wellbore region (or limited wellbore region) of the formation. For example, the low strength proppant placed in the fracture by the third fracturing fluid fills the remaining portion of the fracture (that is, the portion of the fracture that is not filled with high strength proppant).

In accordance with the disclosed methods, the fourth fracturing fluid enters the fracture, keeps the fracture open and squeezes high strength proppant into the portion of the fracture into which high strength proppant was placed by the second fracturing fluid. The presence of the low strength proppant in the fracture and using the third fracturing fluid to induce a screen out if this occurs (discussed below) allows additional high strength proppant to be squeezed by the fourth fracturing fluid into the same portion of the fracture in which high strength proppant was placed by the second fracturing fluid. For example, the high strength proppant in the fourth fracturing fluid can have a particle size that is larger than the particle size of the low strength proppant. Squeezing additional high strength proppant into this portion of the fracture assures that the fracture is completely packed with proppant.

The large propped surface area created by the frac pack allows production fluids to bypass any near wellbore damage and reduces fluid flow velocity in the near-wellbore area thereby reducing drag forces. The reduction of drag forces mitigates migration of formation sand and fines with production fluids into the wellbore. The fracture itself also helps improve hydrocarbon flow and increase production.

For example, the first fracturing fluid can be formed into a high efficiency fracturing fluid by adding a fluid loss control agent to the first fracturing fluid, adding a viscosifying agent to the first fracturing fluid, or both. For example, adding a fluid loss control agent to the first fracturing fluid induces the formation of a filter cake to help prevent the first fracturing fluid from leaking off into the formation. For example, adding a viscosifying agent to the first fracturing fluid increases the viscosity of the first fracturing fluid which in turn helps prevent the first fracturing fluid from leaking off into the formation.

For example, the first fracturing fluid can be formed into a high efficiency fracturing fluid by adding a fluid loss control agent to the first fracturing fluid. Examples of fluid loss control agents that can be added to the first fracturing fluid to form it into a high efficiency fracturing fluid are set forth below. More than one fluid loss control agent can be used.

For example, the fluid loss control agent(s) can be added to the first fracturing fluid in an amount in the range of from about 0.1% by weight to about 10% by weight, based on the weight of the fracturing fluid. For example, the fluid loss control agent(s) can be added to the first fracturing fluid in an amount in the range of from about 0.3% by weight to about 0.5% by weight, based on the weight of the fracturing fluid. The exact amount of the fluid loss control agent(s) needed to form the first fracturing fluid into a high efficiency fracturing fluid will vary to some extent based on, for example, the types of any other components included in the first fracturing fluid and the specific fluid loss control agent(s) used.

For example, the first fracturing fluid can be formed into a high efficiency fracturing fluid by adding a viscosifying agent to the first fracturing fluid. Examples of viscosifying agents that can be added to the first fracturing fluid to increase the viscosity of the fluid and form it into a high efficiency fracturing fluid are also set forth below. More than one viscosifying agent can be used.

For example, the viscosifying agent(s) can be added to the first fracturing fluid in an amount in the range of from about 0.01% by weight to about 5% by weight, based on the weight of the fracturing fluid. For example, the viscosifying agent(s) can be added to the first fracturing fluid in an amount in the range of from about 0.1% by weight to about 2% by weight, based on the weight of the fracturing fluid. The exact amount of the viscosifying agent(s) needed to form the first fracturing fluid into a high efficiency fracturing fluid will vary to some extent based on, for example, the types of any other components included in the first fracturing fluid and the specific viscosifying agent(s) used.

For example, the first fracturing fluid can be formed into a high efficiency fracturing fluid by increasing the viscosity of the first fracturing fluid to in the range of from about 100 centipoises to about 50,000 centipoises. For example, the first fracturing fluid can be formed into a high efficiency fracturing fluid by increasing the viscosity of the first fracturing fluid to in the range of from about 500 centipoises to about 5,000 centipoises. The exact viscosity of the first fracturing fluid required to make the first fracturing fluid a high efficiency fracturing fluid will also vary to some extent based on, for example, whether one for more fluid loss control additives are added to the first fracturing fluid and the type of any other components included in the first fracturing fluid.

As set forth above, the second and fourth fracturing fluids are injected into the formation at a pressure sufficient place high strength proppant in a portion of the fracture in a near-wellbore region of the formation (no greater than 10 m from the wellbore), and the third fracturing fluid is injected into the formation at a pressure sufficient place low strength proppant in a portion of the fracture in a far-field region of the formation (greater than 10 m from the wellbore). For example, the second and fourth fracturing fluids can be injected into the formation at a pressure sufficient place high strength proppant in a portion of the fracture in a limited near-wellbore region of the formation (no greater than 3 m from the wellbore), and the third fracturing fluid can be injected into the formation at a pressure sufficient place low strength proppant in a portion of the fracture in an expanded far-field region of the formation (greater than 3 m from the wellbore).

The methods disclosed herein can be used to form both sand screen frac packs and screenless frac packs in the formation. For example, in one embodiment, the method is used to form a sand screen frac pack in the formation. The wellbore has an annular wall, at least in the desired wellbore interval. In this embodiment, the method further comprises:

prior to step (a), installing a sand screen in the desired wellbore interval, wherein the sand screen has an inside surface, an outside surface, and a size and shape such that an annulus is formed between the outside surface of the sand screen and the annular wall of the wellbore in the desired wellbore interval; and injecting a screen fracturing fluid that includes a proppant into the wellbore at a pressure sufficient to place proppant in the annulus between the outside surface of the sand screen and the annular wall of the wellbore in the desired wellbore interval, wherein the screen fracturing fluid is a low viscosity fracturing fluid.

For example, in one embodiment, the sand screen has an annular shape and an outside diameter. In this embodiment, the outside diameter of the sand screen is less than the diameter of the wellbore, thereby creating the annulus between the outside surface of the sand screen and the annular wall of the wellbore in the desired wellbore interval. For example, the sand screen can be formed of metal.

As set forth above, a "screen fracturing fluid" is a fracturing fluid that is used to place proppant in the annulus between the outside surface of a sand screen and the wellbore wall (the "screen annulus"). In accordance with the disclosed methods, the screen fracturing fluid enters the fracture, keeps the fracture open and places proppant in in the screen annulus. For example, the annular valve at the surface can be opened to allow fluid circulation into the wash pipe thereby allowing the screen fracturing fluid to be taken out of the well and placement of proppant into the screen annulus to occur.

Since the fracture in the formation is now full of proppant, the screen fracturing fluid places proppant in the screen annulus. For example, once the screen annulus is generally full of proppant, the screen fluid can also be used to squeeze proppant into the screen annulus. Squeezing proppant into the screen annulus assures that the screen annulus is completely packed with proppant. For example, the proppant placed in or squeezed into the screen annulus can be high strength proppant.

When the methods disclosed herein are used to form a sand screen frac pack and high strength proppant is to be placed in the screen annulus, the fourth fracturing fluid can be used as the screen fracturing fluid. In this case, once the portion of the fracture in a near-wellbore region of the wellbore is completely packed with high strength proppant, continued injection of the fourth fracturing fluid into the formation will place or squeeze high strength proppant into the screen annulus.

For example, the methods may be used to form a screenless frac pack in the formation. In these embodiments, the high strength proppant placed and squeezed into the fracture by the second and fourth fracturing fluids, respectively, is coated with a consolidating agent. For example, a consolidating agent can be added to the second and fourth fracturing fluids and allowed to coat the high strength proppant therein as the methods are carried out. Examples of suitable consolidating agents are set forth below.

The consolidating agent coated onto the high strength proppant consolidates and locks the proppant in place in the frac pack, preventing the proppant from flowing back during well production. As a result, and because the consolidated high strength frac pack functions as a permeable, in-situ sand screen that is located in a portion of the fracture in the near-wellbore region of the formation, it is not necessary to install a sand screen in the desired wellbore interval.

For example, the consolidating agent can be coated onto the proppant placed and squeezed into the fracture by the second and fourth fracturing fluids in an amount in the range of from about 0.1% by weight to about 5% by weight, based on the weight of the proppant. For example, the consolidating agent can be coated onto the proppant placed and squeezed into the fracture by the second and fourth fracturing fluids in an amount in the range of from about 1% by weight to about 3% by weight, based on the weight of the proppant. The exact amount of the consolidating agent coated onto the high strength proppant will depend on a number of factors including the anticipated flow rate of production fluids through the frac pack, the type of proppant that is used, and the type of consolidating agent that is used.

Following injection of the first, second, third, and fourth fracturing fluids, and injection of the screen fracturing fluid (if the method disclosed herein is used to faun a sand screen frac pack), injection of a fracturing fluid into the formation is ceased, whereby the proppant that has been placed in the fracture forms a proppant pack or frac pack that maintains the fracture sufficiently open to allow fluid to flow from the formation through the propped fracture to the wellbore. The liquid portion of fracturing fluid remaining in the fracture either leaks out of the fracture into the formation or is produced back with production fluids.

By using a high viscosity fluid only in connection with the first fracturing fluid, fluid loss to the formation faces in the fracture geometry is controlled. The use of a low viscosity fluid to place the proppant takes advantage of proppant settling in forming tight proppant packs in both the fracture and the screen annulus and helps ensure complete packing of the proppant packs in the fracture and screen annulus without the existence of voids or channels therein. The use of low viscosity fluid also helps minimize damage to the formation permeability. For example, gel residue left by crosslinked gels used in high viscosity fluids are not a problem in the portion of the fracture in a far-field region of the formation. The tendency of sand to settle on the low side of the fracture in the far-field region of the formation in connection with high viscosity fluids and the resultant void above the settled sand are also not a problem.

Placement of high-strength proppant in the fracture in a near-wellbore region of the formation can help ensure that the propped fracture maintains a high conductivity and connectivity between the wellbore and reservoir. The high strength proppant placed in the frac pack formed herein is more resistant to fracture closure stresses and therefore helps to maintain the permeability of the fracture near the wellbore. High strength proppant helps prevent the formation particulates from occluding the sand screen or migrating with the produced hydrocarbons. The use of high strength proppant to pack the sand screen acts, among other things, to prevent the particulates from entering the production tubing.

For example, all or part of the wellbore penetrating the subterranean formation may include casing pipes or strings placed in the wellbore (a "cased hole" or a "partially cased hole"), in order to, among other purposes, facilitate production of fluids out of the formation and through the wellbore to the surface. For example, the wellbore may also be an "open hole" that has no casing.

The methods disclosed herein can be carried out in connection with both cased wellbores and open hole wellbores. For example, the wellbore may be a cased wellbore. In these embodiments, the method further comprises: prior to step (a), forming one or more access conduits through the casing in the desired wellbore interval to establish communication between the wellbore and the formation. Examples of access conduits include sliding sleeves, hydrajetted holes, perforations, slots, and the like. For example, the access conduits formed through the casing can be perorations or slots. In other examples, the wellbore may be an open hole wellbore. In these embodiments, for example, the open hole in the desired wellbore interval can serve as a passageway that provides fluid communication between the wellbore and the formation The second and fourth fracturing fluids each include a high strength proppant. The screen fracturing fluid can also contain a high strength proppant. As stated above, as a high strength proppant, the proppant has a crush strength of at least 4,000 psi. For example, the high strength proppant can have a crush strength in the range of from 4,000 psi to about 25,000 psi. For example, the high strength proppant can have a crush strength in the range of from about 5,000 psi to about 15,000 psi. For example, the high strength proppant can have a crush strength in the range of from about 10,000 psi to about 12,000 psi. Examples of suitable high strength proppants for use in fracturing fluids used in the methods disclosed herein are set forth below.

The third fracturing fluid includes a low strength proppant. As stated above, as a low strength proppant, the proppant has a crush strength of less than 4,000 psi. For example, the low strength proppant can have a crush strength in the range of from about 1,000 psi to 3,999 psi. For example, the low strength proppant can have a crush strength in the range of from about 1,500 psi to about 2,500 psi. Examples of suitable low strength proppants for use in fracturing fluids used in the methods disclosed herein are set forth below.

An advantage of using a low strength proppant in connection with the third fracturing fluid is the lower cost of low strength proppant as compared to high strength proppant. For example, as described below, the low strength proppant can be conventional frac sand. Frac sand is readily available and relatively inexpensive. Furthermore, the low strength proppant can comprise the majority of the total proppant placed in the fracture in accordance with the disclosed methods. For example, the low strength proppant can comprise at least about 60% of the total amount of proppant placed in the fracture. For example, the low strength proppant can comprise at least about 80% of the total amount of proppant placed in the fracture.

In addition, when placed in the fracture, the low strength proppant can extend over the majority of the length of the fracture. For example, when placed in the fracture, the low strength proppant can extend over 50% of the length of the fracture. For example, when placed in the fracture, the low strength proppant can extend over 90% of the length of the fracture. For example, the low strength proppant fills the portion of the fracture not occupied by the high strength proppant.

For example, the flow rates of production fluids entering and flowing through portions of the propped fracture in a far-field region of the formation are generally lower compared to the flow rates of production fluids in portions of the fracture in a near-wellbore region of the formation. Fracture closure stresses in portions of the fracture in a far-field region of the formation are also generally lower than fracture closure stresses in portions of the fracture in a near-wellbore portion of the formation. As a result, low strength proppant is suitable for use in the fracture in the far-field region of the formation and the far (non-wellbore) side of the near-wellbore region of the formation.

For example, in certain embodiments, the method further comprises, in connection with step (c), after the low strength proppant is placed in a portion of the fracture in the far-field region of the formation, reducing the injection rate at which the third fracturing fluid is injected into the formation in order to induce a tip screen out at the tip of the fracture in the far-field region of the formation. As stated above, a tip screen out is a condition that occurs when a proppant slurry approaches the leading edge (or tip) of fracture, and the base fluid of the fracturing fluid leaks off into the formation, causing the proppant slurry to dehydrate and a proppant bridge to be formed at the tip of the fracture. The proppant bridge stops the propagation of the fracture and keeps proppant from moving out of the fracture. The tip screen out in terms helps allow the fourth injection fluid to squeeze additional high strength proppant into the portion of the fracture in which high strength proppant was placed by the second fracturing fluid. The tip screen out can also widen the fracture in the portion of the fracture in the near-wellbore region of the formation and allow a higher concentration of high strength proppant to be placed in this area.

The size of the proppant used to form the frac pack in accordance with the disclosed methods is designed to mitigate migration of sand and formation fines through the frac pack while still allowing for high production fluid flow rates. For example, the particle size of both the high strength proppant and the low strength proppant can generally be in the range from about 400 mesh to about 10 mesh, as measured by the US Standard Sieve series. For example, the high strength proppant in the fourth fracturing fluid can have a particle size that is larger than the particle size of the low strength proppant. For example, the high strength proppant in the fourth fracturing fluid can have a particle size of at least 20/40 mesh, and the low strength proppant in the third fracturing fluid can have a particle size no greater than 30/40 mesh, as measured by the US Standard Sieve series. For example, the high strength proppant in the fourth fracturing fluid can have a particle size of at least 16/20 mesh, and the low strength proppant can have a particle size no greater than 40/70 mesh as measured by the US Standard Sieve series.

As stated above, as low viscosity fracturing fluids, the second, third, fourth and screen fracturing fluids each have a viscosity of no greater than 40 centipoises. For example, the second, third, fourth and screen fracturing fluids can each have a viscosity in the range of about 2 centipoises to 40 centipoises. For example, the second, third, fourth and screen fracturing fluids can each have a viscosity in the range of about 3 centipoises to about 10 centipoises.

An example of a low viscosity fluid suitable for use in forming the second, third, fourth and screen fracturing fluids (e.g., for use as the base fluid of the second, third, fourth and screen fracturing fluids) is a "slickwater fluid." As stated above, a slickwater fluid is an aqueous fluid that includes a friction reducing agent and has a viscosity of no greater than 40 centipoises. Examples of friction reducing agents that can be used to form a slickwater fluid include polysaccharides, polyacrylamides, and combinations thereof. Additional examples of a low viscosity fluid suitable for use in forming the second, third, fourth and screen fracturing fluids (e.g., for use as the base fluid of the second, third, fourth and screen fracturing fluids) include, but are not limited to, aqueous fluids that include linear gels, hydroxyethyl cellulose, carboxymethyl hydroxyethyl cellulose, carboxymethyl hydroxypropyl guar, and combinations thereof.

The methods disclosed herein can be carried out in connection with any type of well, including oil and gas wells, oil wells, gas wells and water wells. The well can be land based or offshore. In carrying out the disclosed methods, the fracturing fluids can be injected through the wellbore and through one or more access conduits into the formation. The methods disclosed herein are applicable to wellbores at any angle including, but not limited to, vertical wells, deviated wells, highly deviated wells, horizontal wells, and hybrid wells that comprise sections of any combination of the aforementioned wells.

The first fracturing fluid can be injected into the subterranean formation at a pressure sufficient to form a fracture in the formation, and the remaining fracturing fluids can be injected into the formation at a pressure sufficient to keep the fracture open in accordance with the disclosed methods in any manner known to those skilled in the art with the benefit of this disclosure. For example, the pressure needed to form a fracture in the formation and keep the fracture open is a function of the hydrostatic pressure (e.g., the weight of the hydrostatic column) and the surface pressure provided by the pumping equipment, less the frictional pressure losses due, in part, to the tubing and other downhole equipment as the fracturing fluid passes therethrough. The fracture gradient of the formation can be calculated to predict the needed fracture pressure. The fracturing fluids can be injected into the formation using pumping equipment.

For example, the first fracturing fluid injected into the formation in accordance with the disclosed methods can be transitioned to the second fracturing fluid, the second fracturing fluid can be transitioned to the third fracturing fluid, and the third fracturing fluid can be transitioned to the fourth fracturing fluid without ceasing the pumping process or otherwise reducing the hydraulic pressure placed on the formation below a pressure sufficient to keep the fracture open. As known to those skilled in the art with the benefit of this disclosure, if needed or desired, a pill can be pumped into the formation following pumping of a fracturing fluid and prior to pumping of a subsequent fracturing fluid in order to allow the transition from one fracturing fluid to a subsequent fracturing fluid to be made. However, it may be advantageous to carry out the disclosed methods without using proppant aggregates or without injection pulsing.

For example, proppant (both high strength proppant and low strength proppant) can be placed in the fracture and/or screen annulus in accordance with the disclosed methods by pumping the proppant containing fracturing fluid into the formation and allowing the proppant to settle out of the fracturing fluid into the fracture. For example, high strength proppant can be squeezed into the fracture or screen annulus by varying the injection rate of the fracturing fluid and the pressure at which the fracturing fluid is injected into the formation. For example, the injection rate of the fracturing fluid can be lowered while maintaining the pressure placed on the formation to squeeze high strength proppant into the fracture and/or screen annulus.

The various fracturing fluids that are injected into the formation in connection with the disclosed methods include a base fluid and, at least in connection with the second, third and fourth fracturing fluids, one or more additional components (for example, proppant). The additional components can be mixed with the base fluid in any manner known to those skilled in the art with the benefit of this disclosure. For example, the additional component(s) can be mixed with the base fluid using mixing equipment. For example, the additional component(s) can be mixed with the base fluid on the site of the well including on the fly as the base fluid and additional component(s) are pumped into the wellbore and the frac packing treatment is carried out.

For example, the base fluid of the fracturing fluids used in the disclosed methods can be an aqueous-based fluid or an oil-based fluid. The aqueous-based fluid or oil-based fluid can include an aqueous-miscible fluid, a water-in-oil emulsion, or an oil-in-water emulsion. For example, each of the first, second, third, fourth and screen fracturing fluids can include an aqueous-based base fluid.

For example, the base fluid of each of the fracturing fluids can be an aqueous-based fluid. For example, the base fluid of each of the fracturing fluids can be water. The water can come from a variety of sources. For example, the water can be fresh water, saltwater (for example, water containing one or more salts dissolved therein), brine (for example, saturated saltwater or produced water), seawater, brackish water, produced water (for example, water produced from a subterranean formation), formation water, treated flowback water, and mixtures thereof. Generally, the water can be from any source, provided that it does not contain components that might adversely affect the stability and/or performance of the fracturing fluids.

For example, the base fluid of the fracturing fluid used in the disclosed methods can be an oil-based fluid. Suitable oil-based fluids include alkanes, olefins, aromatic organic compounds, cyclic alkanes, paraffins, diesel fluids, mineral oils, desulfurized hydrogenated kerosenes, and any combination thereof.

Suitable aqueous-miscible fluids for use in connection with the base fluid of the fracturing fluid used in the disclosed methods include alcohols such as methanol, ethanol, n-propanol, isopropanol, n-butanol, sec-butanol, isobutanol, and t-butanol; glycerins; glycols such as polyglycols, propylene glycol, and ethylene glycol; polyglycol amines; polyols; combinations of such compounds with salts such as sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate; and combinations thereof.

Suitable water-in-oil emulsions, also known as invert emulsions, for use in connection with the base fluid of the fracturing fluid used in the disclosed methods may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base carrier fluid, where the amount may range from any lower limit to any upper limit and encompass any subset therebetween. It should be noted that for water-in-oil and oil-in-water emulsions, any mixture of the above may be used including the water being and/or comprising an aqueous-miscible fluid.

For example, if needed or desired, the density of the base fluid can be adjusted, for example, to provide additional proppant transport and suspension in the fluid. For example, the pH of the base fluid can be adjusted (for example, by a buffer or other pH adjusting agent), for example, to activate a crosslinking agent and/or to reduce the viscosity of the fluid (for example, to activate a breaker or deactivate a crosslinking agent). For example, the pH may be adjusted to a specific level, which may depend on, among other factors, the types of gelling agents, acids, and other additives included in the base fluid. One of ordinary skill in the art, with the benefit of this disclosure, will recognize when such density and/or pH adjustments are appropriate.

For example, the high strength proppant can be mixed with the base fluid of the second fracturing fluid in an amount in the range of from about 0.5 pounds to about 16 pounds per gallon of the base fluid. For example, the high strength proppant can be mixed with the base fluid of the second fracturing fluid in an amount in the range of from about 1 pound to about 6 pounds per gallon of the base fluid.

For example, the low strength proppant can be mixed with the base fluid of the third fracturing fluid in an amount in the range of from about 0.5 pounds to about 16 pounds per gallon of the base fluid. For example, the low strength proppant can be mixed with the base fluid of the third fracturing fluid in an amount in the range of from about 1 pound to about 6 pound per 1000 gallons of the base fluid.

For example, the high strength proppant can be mixed with the base fluid of the fourth fracturing fluid in an amount in the range of from about 0.5 pounds to about 16 pounds per gallon of the base fluid. For example, the high strength proppant can be mixed with the base fluid of the fourth fracturing fluid in an amount in the range of from about 1 pound to about 6 pounds per gallon of the base fluid.

For example, proppant can be mixed with the base fluid of the screen fracturing fluid in an amount in the range of from about 0.5 pounds to about 16 pounds per gallon of the base fluid. For example, the proppant can be mixed with the base fluid of the screen fracturing fluid in an amount in the range of from about 1 pound to about 6 pounds per gallon of the base fluid.

The proppant used in the disclosed methods, including the high strength proppant and the low strength proppant, can generally be any type of proppant particulate suitable for use in propping open fractures in subterranean formations as known to those skilled in the art, as long as the proppant has a crush strength as specified herein. Suitable proppant particulates include all shapes of materials, including substantially spherical materials, low to high aspect ratio materials, fibrous materials, polygonal materials (such as cubic materials), and mixtures thereof.

Examples of proppant particulates that can be used include sand (for example natural sand and frac sand), bauxite, ceramic proppant materials, glass materials, metal materials, polymer materials, polytetrafluoroethylene materials, fly ash, silica flour, seed shell pieces, fruit pit pieces, composite particulates including wood composite particulates, nut shell pieces including walnut hulls (for example, ground walnut hulls), resin pre-coated proppant particulates such as resin pre-coated sand, man-made non-degradable proppant particulates, and mixtures thereof. Examples of man-made primary proppant particulates include bauxite, ceramics, and polymeric composite particulates. Suitable composite particulates include a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof.

For example, the proppant particulates can be selected from the group of sand, walnut hulls, resin pre-coated proppant particulates, man-made proppant particulates, and mixtures thereof. For example, the proppant particulates of the aqueous based proppant slurry disclosed herein can be sand.

For example, the proppant particulates can also include degradable materials. Suitable degradable materials include, for example, materials that deform or melt upon heating such as thermoplastic materials, hydrolytically degradable materials, materials degradable by exposure to radiation, materials reactive to acidic fluids, or any combination thereof. For example, the degradable materials can be degraded or degradation of the materials may be initiated by temperature, presence of moisture, oxygen, microorganisms, enzymes, pH, free radicals, a delayed-release acid, such as an acid-releasing degradable material or an encapsulated acid or a treatment fluid subsequently introduced into formation.

Examples of degradable polymers that can be used as the proppant in accordance with the methods disclosed herein include, but are not limited to, polysaccharides such as cellulose, chitin, chitosan, and proteins. Specific examples include homopolymers and random, block, graft, and star- and hyper-branched aliphatic polyesters. Additional examples of suitable degradable polymers include, but are not limited to, aliphatic polyesters; poly(lactides); poly(glycolides); poly(E-caprolactones); poly(hydroxy ester ethers); poly(hydroxybutyrates); poly(anhydrides); polycarbonates; poly(orthoesters); poly(amino acids); poly(ethylene oxides); poly(phosphazenes); poly(ether esters), polyester amides, polyamides, and copolymers or blends of any of these degradable polymers, and derivatives of these degradable polymers. The term "copolymer" as used herein is not limited to the combination of two polymers, but includes any combination of polymers, e.g., terpolymers and the like. The term "derivative" is used herein to include any compound that is made from one of the listed compounds, for example, by replacing one atom in the base compound with another atom or group of atoms.

For example, the proppant particulates used in the disclosed methods can be aliphatic polyesters such as poly(lactic acid), poly(anhydrides), poly(orthoesters), and poly(lactide)-co-poly(glycolide) copolymers. For example, the proppant particulates used in the disclosed methods can be formed of poly(lactic acid), poly(orthoesters), and combinations thereof. In choosing an appropriate degradable material, one should consider the degradation products that will result and whether the degradation material will adversely affect other operations or components.

Specific examples of high strength proppant that can be included in fracturing fluids used in accordance with the methods disclosed herein include, but are not limited to, high-quality sand, particulate garnet, metal particulates, ceramic proppants, aluminum oxide, bauxite, bauxitic clay, kaolin, alumino-silicates, iron oxide, and other ores or minerals, cement, cement composites, ceramics, polymer composites containing particulate materials, such as nanoparticles, porous ceramics, porous organic materials, porous metals and composites and combination thereof. For example, the high strength proppant can be light weight high strength proppant. For example, the high strength proppant can be a ceramic or ceramic composite material. For example, the high strength proppant can be selected from the group of resin-coated sand, geopolymer-coated sand, composite proppant, ceramic proppant, steel balls, and combinations thereof. The high strength proppant may be of any shape, including substantially or partially spherical in shape, substantially or partially round in shape, cylindrical, fibrous, polygonal shaped (such as cubic), irregularly shaped, and any combination thereof.

Specific examples of low strength proppant that can be included in fracturing fluids used in accordance with the methods disclosed herein include, but are not limited to, low-quality sand, nut shell pieces, seed shell pieces, fruit pit pieces, wood, silica, barite, meta-silicate, calcium silicate, kaolin, talc, zirconia, boron, fly ash, hollow glass microspheres, and composites and combinations thereof. For example, the low strength proppant can be selected from the group of natural sand, brown sand, local sand, white sand, glass beads, glass spheres, and combinations thereof. For example, the low strength proppant can be frac sand of low quality. The low strength proppant may be any shape, including substantially or partially spherical in shape, substantially or partially round in shape, cylindrical, fibrous, polygonal shaped (such as cubic), irregularly shaped, and any combination thereof.

For example, the density of the high strength proppant can be in the range of about 2.5 $g/cm^3$ to about 8.5 $g/cm^3$. For example, light-weight, high strength proppant has a similar density as that of natural sand, i.e., about 2.6 $g/cm^3$, but has much higher crush resistance, i.e., >8,000 psi. For example, the density of the low strength proppant can be in the range of about 2.3 $g/cm^3$ to about 3.0 $g/cm^3$.

For example, the fluid loss control agent(s) added to the first fracturing fluid to form it into a high efficiency fracturing fluid can be selected from the group of a breakable material, a degradable material, a dissolvable material, a water-soluble polymer, a particulate solid, and any derivative thereof, and combinations of the foregoing. For example, the fluid loss control agent(s) can be selected from the group of water degradable particulates, hydrolysable esters, oil soluble particulates, and combinations thereof. For example, the fluid loss control agent(s) can be at least one degradable material selected from the group of a poly(lactide); a poly(glycolide); a poly(.epsilon.-caprolactone); a poly(hydroxy ester ether); a poly(hydroxybutyrate); a poly(anhydride); a polycarbonate; a poly(orthoester); a poly(amino acid); a poly(ethylene oxide); a poly(phosphazene); a poly ether ester; a polyester amide; a polyamide; a poly(lactic acid), a poly(anhydride), a poly(orthoester), a poly(lactide)-co-poly(glycolide)copolymer; a fatty alcohol, a fatty ester, a fatty acid salt, a proteinous material, and any derivative thereof, and combinations of the foregoing.

For example, the viscosifying agent(s) added to the first fracturing fluid to increase the viscosity of the fluid and form it into a high efficiency fracturing fluid can be selected from the group of a degradable fine particulate material, a gelling agent, a cross-linkable gelling agent, a cross-linker, a gel breaker, a foaming agent, and mixtures thereof. For example, the viscosifying agent(s) can be selected from the group of celluloses, polysaccharides, guar-based polymers, synthetic polymers, polyacrylamides, and mixtures thereof. Specific examples of viscosifying agents that can be added to the first fracturing fluid to increase the viscosity of the fluid and form it into a high efficiency fracturing fluid include, but are not limited to, guar, hydroxypropyl guar, carboxymethyl hydroxypropyl guar, hydroxyethyl cellulose, carboxymethyl hydroxyethylcellulose, xanthan, diutan, and scleroglucan. For example, the guar and hydroxypropyl guar can be crosslinked. The exact type of viscosifying agent(s) utilized depends in part on the permeability of the formation.

For example, the first fracturing fluid can include a cross-linkable gelling agent, a cross-linker, and a gel breaker, and can be pumped into the formation in a manner such that the gelling agent cross-links thereby increasing the viscosity of the first fracturing fluid. If a cross-linkable gel is used, the disclosed methods further comprises the steps of allowing the cross-linked gel to break down, thereby decreasing the viscosity of the fracturing fluid, and flowing back the well to remove the broken gel in the fracturing fluid from the fracture.

The cross-linkable gelling agent and cross-linker can be any cross-linkable gelling agent and cross-linker known to those skilled in the art to form a cross-linked gel in fracturing fluids and thereby enhance the viscosity of the fluids in the formation. For example, the cross-linkable gelling agent gels the base fluid in the fracturing fluid and thereby increases its viscosity. For example, the cross-linker functions to cross link the gel and thereby further increase the viscosity of the base fluid. For example, the increased viscosity of the base fluid helps the fracturing fluid form or expand the fracture. Individuals skilled in the art, with the benefit of this disclosure, will recognize the exact types and amounts of cross-linkable gelling agent and cross-linker to use, depending on factors such as the specific components used, the desired viscosity, and formation conditions.

A variety of cross-linkable gelling agents can be used, including biopolymers, synthetic polymers, or a combination thereof. Examples of suitable cross-linkable gelling agents include hydratable polymers that contain one or more functional groups, such as hydroxyl, carboxyl, sulfate, sulfonate, amino, amide, phosphate, phosphonate, and amide groups. Additional examples of suitable cross-linkable gelling agents include biopolymers that include polysaccharides or derivatives thereof that contain one or more of the following monosaccharide units: galactose, mannose, glucoside, glucose, xylose, arabinose, fructose, glucuronic acid, and pyranosyl sulfate. Additional examples of suitable polymers that can be used as the cross-linkable gelling agents include, but are not limited to, xanthan gum, guar gum and derivatives thereof (such as hydroxypropyl guar and carboxymethylhydroxypropyl guar), and cellulose derivatives (such as hydroxyethyl cellulose). Additionally, synthetic polymers and copolymers that contain the above-mentioned functional groups can be used. Examples of such synthetic polymers include, but are not limited to, polyacrylate, polymethacrylate, polyacrylamide, polyvinyl alcohol, and polyvinylpyrrolidone. As a further example, the cross-linkable gelling agent molecule may be depolymerized. The term "depolymerized," as used herein, generally refers to a decrease in the molecular weight of the gelling agent molecule.

For example, the cross-linkable gelling agent can be added to the fracturing fluid in an amount in the range of from about 0.01% to about 5% by weight, based on the weight of the water in the fracturing fluid. For example, the cross-linkable gelling agents can be added to the fracturing fluid in an amount in the range of from about 0.1% to about 2% by weight, based on the weight of the water in the fracturing fluid.

Similarly, a variety of cross-linkers can be used. The cross-linker functions to crosslink the cross-linkable gelling agent in the fracturing fluid to form a cross-linked gel in the fracturing fluid. Suitable cross-linkers comprise at least one metal ion that is capable of crosslinking the cross-linkable gelling agent. Examples include, but are not limited to, borate compounds (such as, for example, alkaline earth metal borates, alkali metal-alkaline earth borates, and mixtures thereof); zirconium compounds (such as, for example, zirconium lactate, zirconium lactate triethanolamine, zirconium carbonate, zirconium acetylacetonate, zirconium malate, zirconium citrate, and zirconium diisopropylamine lactate); titanium compounds (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; and combinations thereof. Further examples of suitable borate compounds include probertite, ulexite, nobleite, frolovite, colemanite, calcined colemanite, priceite, paternoite, hydroboracite, kaliborite, and other similar borates. For example, of the various slightly water-soluble borate compounds that can be used, colemanite, calcined colemanite, and ulexite are good examples. An example of a suitable commercially available borate-based crosslinker is BC-140™ crosslinker available from Halliburton Energy Services, Inc. of Duncan, Okla. An example of a suitable commercially available zirconium-based crosslinker is CL-24™ crosslinker available from Halliburton Energy Services, Inc. of Duncan, Okla. An example of a suitable commercially available titanium-based crosslinking agent is CL-39™ crosslinking agent available from Halliburton Energy Services, Inc. of Duncan, Okla.

For example, the cross-linker can be added to the fracturing fluid in an amount sufficient to provide, inter alia, the desired degree of crosslinking between the cross-linkable gelling agent molecules. For example, the cross-linker can be added to the fracturing fluid in an amount in the range from about 0.001% to about 10% by weight, based on the weight of the water in the proppant slurry. For example, the cross-linker can be added to the fracturing fluid in an amount in the range from about 0.01% to about 1% by weight, based on the weight of the water in the proppant slurry.

The gel breaker can be any gel breaker known to those skilled in the art to break a cross-linked gel formed in fracturing fluids and thereby decrease the viscosity of the fluids in the formation. Any suitable gel breaker can be used, including encapsulated gel breakers and internal delayed gel breakers, such as enzyme, oxidizing, acid buffer, or temperature-activated gel breakers. The gel breakers cause the viscous aqueous base fluid of the fracturing fluid to revert to a lower viscosity fluid that can be produced back to the surface after the fracturing fluid has been used.

For example, the gel breaker can be added in an amount sufficient to place the particulates in the fracture(s) in an amount in the range of from about 0.5% to about 10% by weight, based on the weight of the cross-linkable gelling agent. The gel breaker breaks the cross-linked gel into a linear gel or a water-like fluid.

The cross-linked gel formed in the fracturing fluid is allowed to break down thereby decreasing the viscosity of the fracturing fluid in the formation by allowing sufficient time for the gel breaker in the fracturing fluid to break the gel and the gel to be broken down. The well can be flowed back to remove broken gel in the fracturing fluid from the formation by any manner understood by those skilled in the art with the benefit of this disclosure. For example, the initial stage of production can be carried out in increasing step rates.

For example, the first fracturing fluid used in the methods disclosed herein can be foamed or include a wet gas. For example, when an aqueous base fluid is used, foamed fluids and fluids that include wet gases may minimize the exposure of the subterranean formation to the base fluid, which for some formations advantageously minimizes the deleterious effects that water can have on the formation faces (for example, clay swelling). Foamed fluids and fluids that include wet gases may also, in some embodiments, be capable of helping to suspend the proppant particulates in the base fluid. For example, the first fracturing fluid can include a foaming agent and be pumped into the formation in a manner such that the foaming agent forms a foam thereby increasing the viscosity of the first fracturing fluid.

Examples of gases suitable for use in conjunction with the fracturing fluids include, but are not limited to, nitrogen, carbon dioxide, air, methane, helium, argon, and any combination thereof. One skilled in the art, with the benefit of this disclosure, will understand the benefit of each gas. For example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen. Moreover, the higher density may impart greater proppant transport capability, up to about 12 pounds of proppant per gallon of fracture fluid if necessary.

The foamed fluid can have a foam quality in the range from any lower limit to any upper limit and encompass any subset therebetween. For example, the quality of the foamed fluid can range from a lower limit of about 5%, 10%, 25%, 40%, 50%, 60%, or 70% gas volume to an upper limit of about 95%, 90%, 80%, 75%, 60%, or 50% gas volume. For example, the foamed treatment fluid may have a foam quality from about 85% to about 95%, or about 92% to about 95%.

Examples of suitable foaming agents that can be used in conjunction with the fracturing fluids include, but are not limited to, cationic foaming agents, anionic foaming agents, amphoteric foaming agents, nonionic foaming agents, or any combination thereof. Examples of suitable foaming agents can include, but are not limited to, surfactants like betaines, sulfated or sulfonated alkoxylates, alkyl quarternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, derivatives of such compounds and any combination thereof. For example, the foaming agent can be included in the foamed fluid at a concentration in the range of from about 0.05 to about 2 percent by volume based on the volume of the liquid component in the fluid (for example, from about 0.5 to about 20 gallons foaming agent per 1000 gallons of liquid).

A variety of consolidating agents can be used to coat the high strength proppant placed and squeezed into the fracture by the second and fourth fracturing fluids, respectively. If desired, a consolidating agent can be used to coat the low strength proppant used in the third fracturing fluid as well. For example, at least a majority of the proppant particulates can be at least partially coated with a consolidating agent and allowed to consolidate in-situ within the formation to form a hardenable, permeable or impermeable mass. For example, the consolidating agent can enhance the effectiveness of the proppant particulates in forming a proppant pack and propping open the fracture, and in preventing the proppant particulates from flowing back into the wellbore.

Any type of consolidating agent that will enable the proppant particulates to consolidate within the fracture in the formation can be used. For example, the proppant particulates can be either pre-coated with the consolidating agent or coated with the consolidating agent on the fly as the fracturing fluids are formed and pumped into the wellbore.

Consolidating agents suitable for use in the disclosed methods generally comprise any compound that is capable of minimizing particulate migration. For example, the consolidating agent can be selected from the group consisting of a curable resin, a tackifying agent, and mixtures thereof.

For example, the consolidating agent can be a curable resin. For example, the consolidating agent can be a curable resin selected from the group consisting of epoxies, furans, phenolics, furfuryl aldehydes, furfuryl alcohols, and mixtures thereof. For example, the consolidating agent can be a curable resin selected from the group consisting of epoxies, furans, phenolics, and mixtures thereof.

For example, the consolidating agent can be a tackifying agent. For example, the consolidating agent can be a tackifying agent selected from the group consisting of polyamides, polyesters, polycarbonates, natural resins, zeta-potential reducing agents, and mixtures thereof. For example, the consolidating agent can be a tackifying agent selected from the group consisting of polyamides, polyesters, polycarbonates, and mixtures thereof.

Examples of commercially available consolidating agents that can be used include SANDWEDGE® consolidating agent (available from Halliburton Energy Services, Inc.) and EXPEDITE® consolidating agent (available from Halliburton Energy Services, Inc.). The type and amount of consolidating agent to be used may depend upon, among other factors, the composition and/or temperature of the subterranean formation, the chemical composition of formation fluids, the flow rate of fluids present in the formation, the effective porosity and/or permeability of the subterranean formation, the pore throat size and distribution associated with the formation, and the like. Furthermore, the concentration of the consolidating agent can be varied, inter alia, to either enhance bridging to provide for a more rapid coating of the consolidating agent or to minimize bridging to allow deeper penetration into the subterranean formation. It is within the ability of one skilled in the art, with the benefit of this disclosure, to determine the type and amount of consolidating agent to use in coating the proppant particulates used in the disclosed methods to achieve the desired results.

For example, the consolidating agent can be used to facilitate the consolidation of the proppant particulates into a frac pack in the fracture. For example, the size and nature of the frac pack can vary depending, in part, upon the specific consolidating agent used and the size of the proppant particulates. In wells with or projected to have high production flow rates, for example, a curable resin may be desirable for use as the consolidating agent to prevent any potential break up of the proppant mass. For example, in wells with or projected to have low production flow rates, it may be desirable to use a tackifying agent as the consolidating agent.

For example, in connection with a screenless frac pack treatment in accordance with the methods disclosed herein, all or a portion of the high strength proppant particulates injected into the fracture can be coated with a consolidating agent. For example, in connection with a screenless frac pack treatment in accordance with the methods disclosed herein, all or a portion of the high strength proppant particulates injected into the fracture can be coated with a curable resin.

The proppant particulates that are coated with a consolidating agent can be allowed to consolidate in the fracture by allowing a sufficient time for the consolidating agent to act (and the frac pack to form, for example) before the pressure on the formation is decreased below the pressure required to keep the fracture open. For example, if a curable resin is used as the consolidating agent, it functions to consolidate proppant particulates and hold them together within the fracture as it hardens and cures within the fracture. If a tackifying agent is used, it causes the proppant particulates to cling together within the fracture. For example, by consolidating the high strength proppant particulates injected into the fracture, a frac pack can be formed which can help prevent flow back of proppant particulates into the wellbore.

Various additional components and additives can be included in the fracturing fluids used in accordance with the methods disclosed herein in order to, for example, reduce pumping friction, make it easier to pump the fluids through the wellbore and into the formation, reduce or eliminate the fluid's reaction to the formation, enhance the ability of the fluids to fracture the formation and/or keep the fractures open during the frac packing treatment, enhance the ability of the fluids to place the proppant (including the high strength proppant and the low strength proppant) in the fractures, and make it easier to remove the fluids and any broken down gels and the like from the formation once the frac packing treatment is complete.

Additional additives that can be included in the fracturing fluids used in the disclosed methods include, but are not limited to, friction reducers, hydrocarbon fluids, air, salts, weighting agents, inert solids, fluid loss control agents, emulsifiers, dispersion aids, corrosion inhibitors, emulsion thinners, emulsion thickeners, viscosifying agents, surfactants, lost circulation materials, pH control additives, breakers, biocides, stabilizers, chelating agents, scale inhibitors, mutual solvents, oxidizers, reducers, clay stabilizing agents, and any combination thereof. For example, it may be advantageous to include a clay stabilizing agent in the pad fracturing fluid and/or proppant slurry in order to minimize clay swelling.

The methods disclosed herein are particularly suitable for forming sand screen and screenless frac packs in loosely consolidated and highly permeable formations such as sandstone formations. For example, the methods disclosed herein can be used to form effective frac packs in offshore reservoirs.

Figure 1:
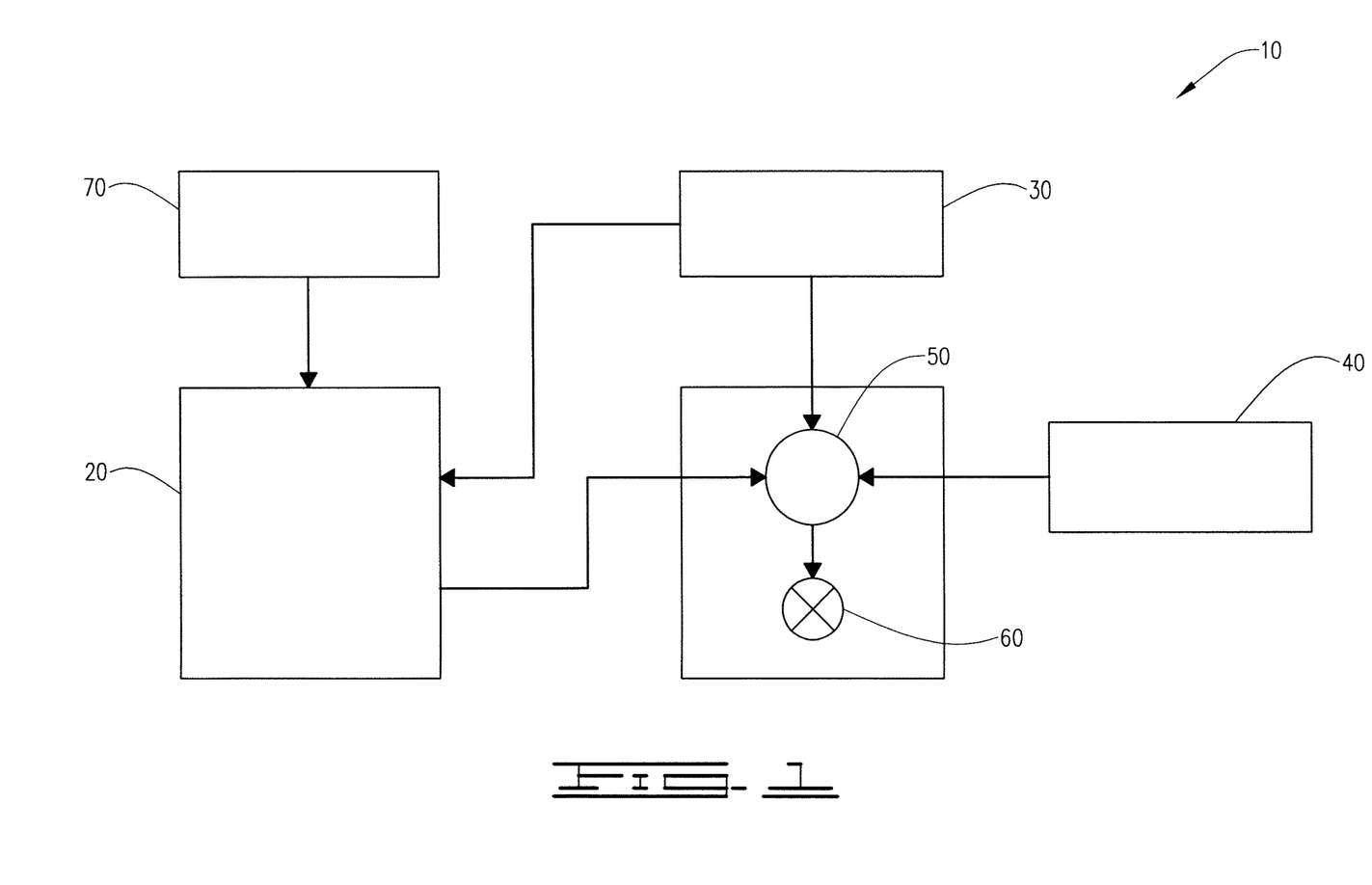
FIG. 1 illustrates an exemplary fracturing fluid production and delivery system 10 that can be used in association with the methods disclosed herein.
Figure 2:
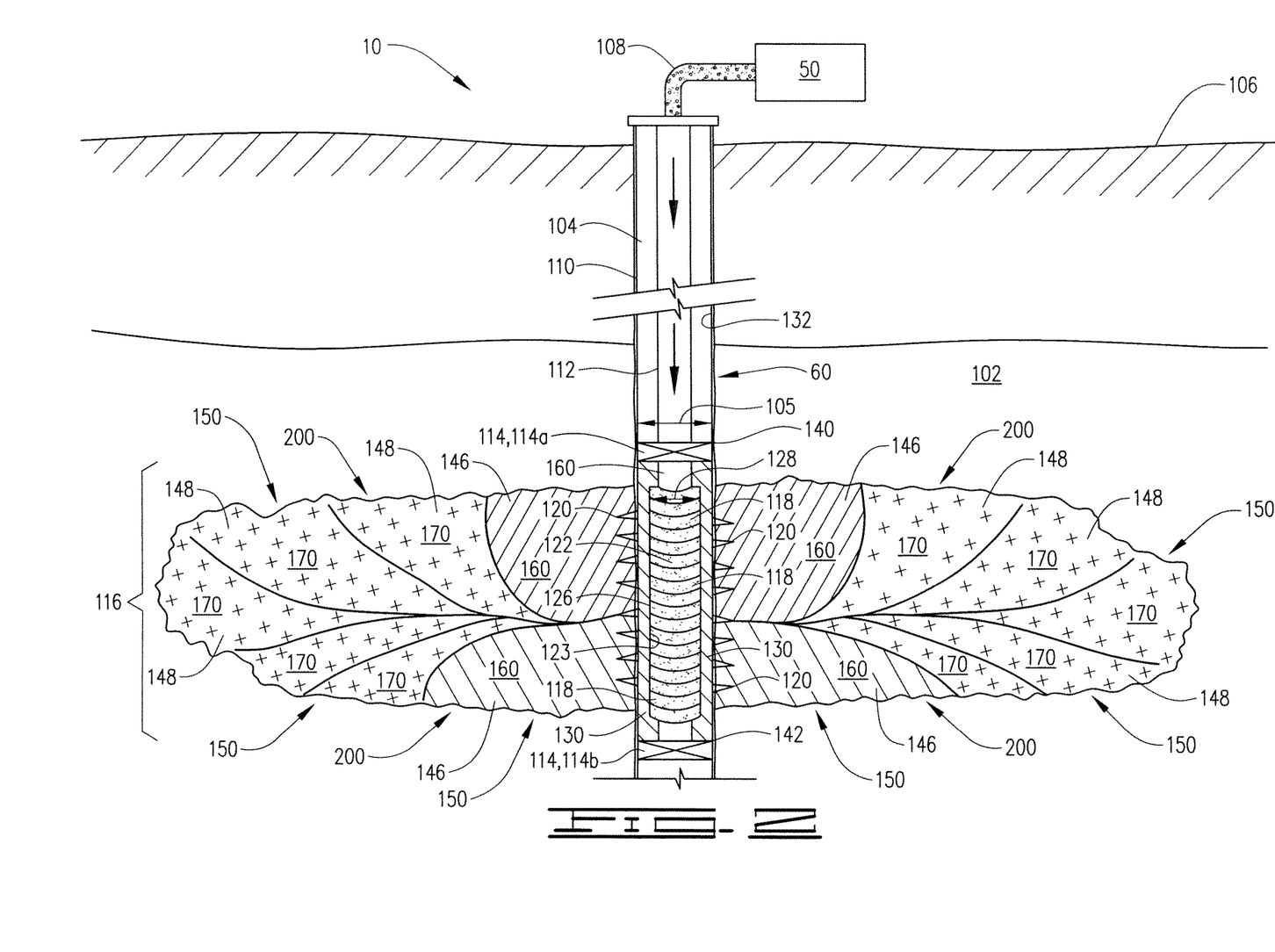
FIG. 2 illustrates the formation of a sand screen frac pack in accordance with one embodiment of the methods disclosed herein.
Figure 3:
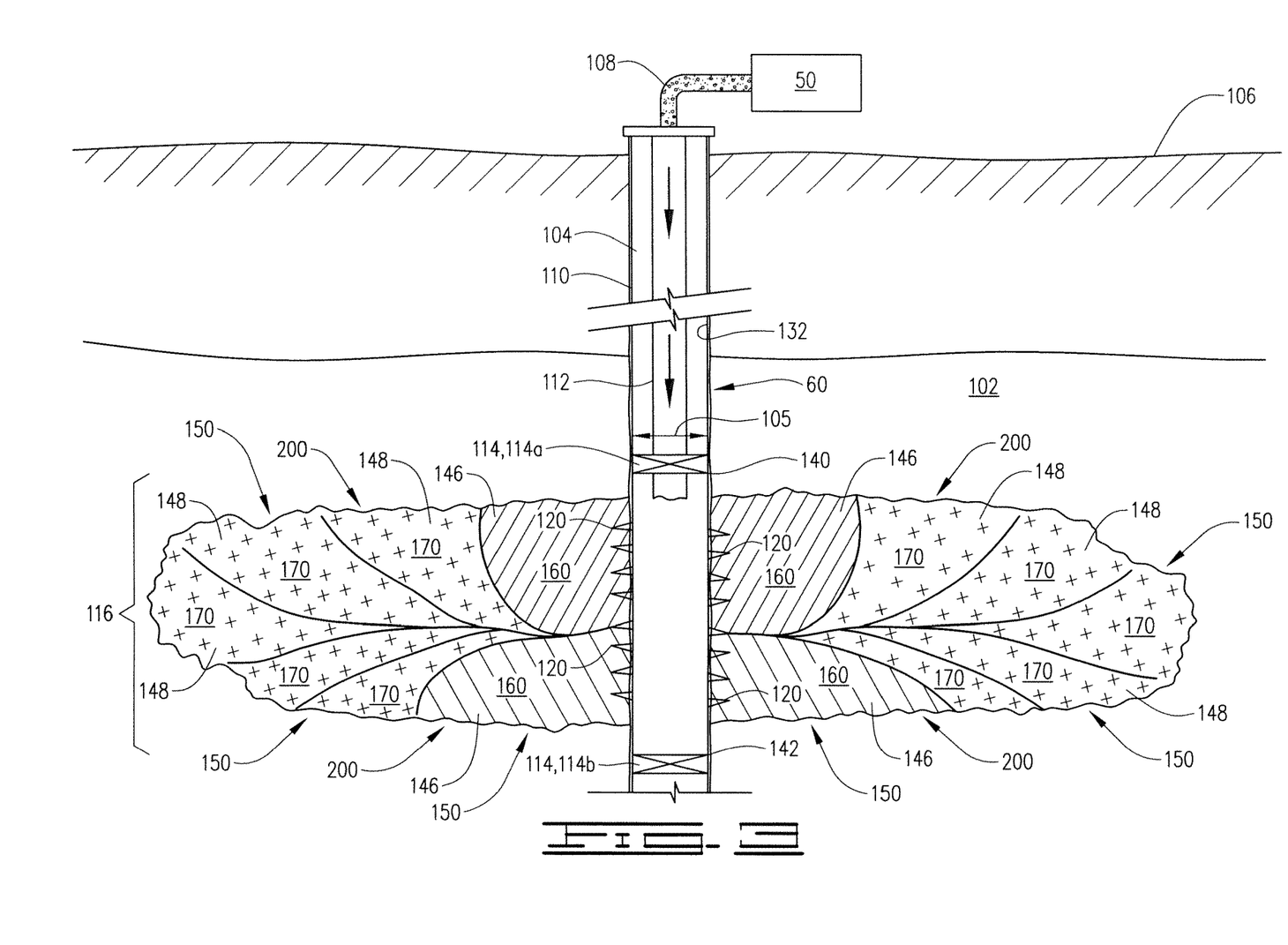
FIG. 3 illustrates the formation of a screenless frac pack in accordance with another embodiment of the methods disclosed herein.

Referring now to FIGS. 1-3 of the drawings, the methods disclosed herein will be further illustrated. FIG. 1 illustrates an exemplary fracturing fluid production and delivery system 10 that can be used in association with the methods disclosed herein. FIGS. 2 and 3 further illustrate such as system as used in association with various embodiments of the methods disclosed herein. Although FIGS. 1 through 3 generally depict a land-based system, it is to be recognized that like systems may be operated in subsea locations as well.

As illustrated by FIG. 1, the fracturing fluid production and delivery system 10 includes a fracturing fluid producing apparatus 20, a fluid source 30, a proppant source 40, and a pump and blender system 50. The system 10 resides at the surface at a well site where a well 60 is located.

In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a frac pack treatment carried out in connection with the well 60 in accordance with the methods disclosed herein or a concentrate to which additional fluid is added prior to use in a frac pack treatment carried out in connection with the well 60 in accordance with the methods disclosed herein. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant (for example, the high strength proppant (HSP) and/or low strength proppant (LSP) used in the methods disclosed herein) for combination with the fracturing fluid. The system may also include an additive source 70 that provides one or more additives (e.g., gelling agents, cross-linking agents, cross-linkers, breakers, foaming agents, weighting agents, and/or other optional additives) to alter the properties of the fracturing fluid. For example, other optional additives can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant (for example, the high strength proppant (HSP) and/or low strength proppant (LSP) used in the methods disclosed herein) from the proppant source 40 and/or additional fluid from an additive source 70. The resulting mixture may be pumped down the well 60 under a pressure sufficient to create or enhance one or more fractures in a subterranean formation, for example, to stimulate production of fluids from the formation. Notably, in certain instances, the fracturing fluid producing apparatus 20, fluid source 30, and/or proppant source 40 may be equipped with one or more metering devices (not shown) to control the flow of fluids, proppants, and/or other compositions to the pump and blender system 50. Such metering devices may permit the pump and blender system 50 to source from one, some or all of the different sources at a given time, and may facilitate the preparation of fracturing fluids in accordance with the present disclosure using continuous mixing or "on-the-fly" methods. Thus, for example, the pump and blender system 50 can provide just fracturing fluid into the well at some times, just proppants at other times, and combinations of those components at yet other times.

FIG. 2 shows the well 60 during a frac pack treatment carried out in accordance with the methods disclosed herein. As shown, the frac pack treatment is carried out in a portion of a subterranean formation of interest 102 surrounding an annular wellbore 104. The annular wellbore 104 has an average inner diameter 105 and extends from the surface 106 into the ground. The fracturing fluids 108 are applied to a portion of the subterranean formation 102 surrounding a vertical portion of the wellbore. Although shown as vertical, the wellbore 104 may include horizontal, vertical, slant, curved, and other types of wellbore geometries and orientations, and the fracturing treatment may be applied to a subterranean zone surrounding any portion of the wellbore. As shown, the wellbore 104 includes a casing 110 that is cemented or otherwise secured to the wellbore wall. The wellbore 104 can also be uncased or include uncased sections.

As shown by FIG. 2, the well 60 is shown with a work string 112 extending from the surface 106 into the wellbore 104. The work string 112 and/or the wellbore 104 may include packers 114 that seal the annulus between the work string 112 and wellbore 104 to define a desired wellbore interval 116 of the wellbore 104 adjacent to the portion of the subterranean formation of interest 102 into which the fracturing fluids 108 will be pumped. A plurality of openings 118 are formed in a portion of the work string 112 to allow fluid communication between the work string and the portion of the wellbore 104 in the desired wellbore interval 116.

A plurality of access conduits 120 extends through the casing 110 over the length of the desired wellbore interval 116 to establish communication between the wellbore and the formation. For example, the access conduits 120 can be perforations. The perforations 120 allow the fracturing fluids, proppant and/or other components to flow from the wellbore into the subterranean formation 102, and production fluids and other components to flow from the formation into the wellbore. In cased wells, the perforations 120 can be formed using shape charges, a perforating gun, hydro jetting and/or other tools.

The pump and blender system 50 is coupled to the work string 112 to pump the various fracturing fluids 108 used in association with the disclosed methods into the wellbore 104. The work string 112 may include coiled tubing, jointed pipe, and/or other structures that allow fluid to flow into the wellbore 104. The work string 112 can include flow control devices, bypass valves, ports, and or other tools or well devices that control a flow of fluid from the interior of the work string 112 into the subterranean zone 102. For example, the work string 112 may include ports adjacent the wellbore wall to communicate the fracturing fluid 108 directly into the subterranean formation 102, and/or the work string 112 may include ports that are spaced apart from the wellbore wall 132 to communicate the fracturing fluid 108 into an annulus in the wellbore between the work string 112 and the wellbore wall.

As shown by FIG. 2, an annular sand screen 122 is installed in the desired wellbore interval 116 around the work string 112 and over the openings 118 in the work string. The annular sand screen 122 has an inside surface 123, an outside surface 126, and an outside diameter 128. The outside diameter 128 of the sand screen 122 is less than the internal diameter 105 of the wellbore 104 in the desired wellbore interval 116 thereof such that an annulus 130 is formed between the outside surface 126 of the sand screen and the wall 132 of the wellbore.

A set of packers 114 are installed in the wellbore 104 to seal the annulus between the work string 112 and the wellbore 104 to define the desired wellbore interval 116 of the wellbore into which the fracturing fluids 108 may be introduced. As shown, a packer 114a defines an uphole boundary 140 of the interval 116, and a packer 114b defines the downhole end 142 of the interval. The annular sand screen 122 is installed in the wellbore 104 between the packers 114a and 114b. The work string 112 extends through the packer 114a and sand screen 122 to the packer 114b. The formation 102 extends around the desired wellbore interval 116. The formation 102 includes a near-wellbore region (or limited near well-bore region) 146 and a far-field region (or expanded far field region) 148.

In accordance with the methods disclosed herein, the various fracturing fluids 108 are pumped into the work string 112, through the openings 118 of work string 112 and through the sand screen 122 into the wellbore 104, and through the screen annulus 130 and perforations 120 into the formation 102.

The first fracturing fluid is injected into the formation at a hydraulic pressure sufficient to form a fracture 150 in the subterranean formation 102 that propagates into the far-field region 148 of the formation. The second fracturing fluid 108 is then injected into the formation 102 at a hydraulic pressure sufficient to keep the fracture 150 open and place high strength proppant 160 in a portion of the fracture in the near-wellbore region 146 of the formation. The third fracturing fluid 108 is then injected into the formation 102 at a hydraulic pressure sufficient to keep the fracture 150 open and place low strength proppant 170 in a portion of the fracture 150 in the far-field region 148 of the formation. Next, the fourth fracturing fluid 108 is injected into the formation 102 at a hydraulic pressure sufficient to keep the fracture 150 open and squeeze high strength proppant 160 into the portion of the fracture 150 into which high strength proppant from the second fracturing fluid was placed (in the near-wellbore region 146 of the formation). Thereafter, the screen fracturing fluid 108 is injected into the wellbore 104 at a pressure sufficient to place proppant in the screen annulus 130.

Once the proppant has been placed in the screen annulus 130, injection of a fracturing fluid 108 into the formation 102 is stopped. Once injection of fracturing fluid 108 is stopped, the hydraulic pressure on the formation 102 is released, and the fracture 150 will no longer be held open by the pressure. However, at this point, a sand screen proppant pack 200 including the proppant 160 and proppant 170 has been formed and functions to "prop" the fracture 150 and maintain it sufficiently open thereby allowing fluids to flow more freely through the fracture to the wellbore 104.

FIG. 3 illustrates the formation of a screenless frac pack. The same steps described in FIG. 2 are carried out, except the annular sand screen 122 is not installed in the wellbore 104. Also, the second and fourth fracturing fluids 108 are coated with a consolidating agent.

The packer 114a (defining an uphole boundary 140 of the interval 116) and packer 114b (defining the downhole end 142 of the interval) are still installed. The work string 112 extends through the packer 144 into the desired wellbore interval 116. The screen fracturing fluid 108 described in connection with FIG. 2 is not needed, as there is no screen annulus to pack with proppant.

Once the fracture 150 has been packed with high strength proppant 160 in the near-wellbore region 146 of the formation 102 by injection of the fourth fracturing fluid 108 into the formation, injection of a fracturing fluid 108 into the formation 102 is stopped. Once injection of fracturing fluid 108 is ceased, the hydraulic pressure on the formation 102 is released, and the fracture 150 is no longer held open by the pressure. However, at this point, a screenless proppant pack 210 including consolidated proppant 160 and proppant 170 has been formed and functions to "prop" the fracture 150 and maintain it sufficiently open thereby allowing fluids to flow more freely through the fracture to the wellbore 104.

For example, and with reference to FIGS. 2 and 3, the disclosed fluids, compositions and methods may directly or indirectly affect one or more components or pieces of equipment associated with an exemplary fracturing system 10, according to one or more embodiments. While not specifically illustrated herein, the disclosed compositions and methods may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

EXAMPLE

The following prospective example illustrates a specific embodiment consistent with the present disclosure but does not limit the scope of the disclosure or the appended claims. The example was not actually carried out. Concentrations and percentages are by weight unless otherwise indicated.

Example 1

A screenless frac-pack treatment is performed in an interval of a 5 mD sandstone formation as follows. A fracturing fluid having a total fracturing fluid volume of 100,000 gallons is prepared. The fracturing fluid comprises an aqueous base fluid including water, 2% potassium chloride (KCl) (w/v), and 25 lbm/1000 gal of a guar-based polymer. Table 1 below provides a sequence of injection fluids with their injection rates, volumes, proppant materials, and proppant concentrations. HSP refers to high strength proppant. LSP refers to low strength proppant.

| Injection stage no. | Fluid type | Fluid volume (gal) | Injection rate (BPM) | Proppant material | Proppant conc. (lbm/gal) |
| --- | --- | --- | --- | --- | --- |
| 1 First Fracturing Fluid | Pad - Crosslinked | 20,000 | 25 | None | 0 |
| 2 Second Fracturing Fluid | Linear gel - Proppant slurry | 10,000 | 25 | HSP | 1 |
| 3 Second Fracturing Fluid | Linear gel - Proppant slurry | 10,000 | 25 | HSP | 2 |
| 4 Second Fracturing Fluid | Linear gel - Proppant slurry | 10,000 | 25 | HSP | 3 |
| 5 Third Fracturing Fluid | Linear gel - Proppant slurry | 10,000 | 25 | LSP | 3 |
| 6 Third Fracturing Fluid | Linear gel - Proppant slurry | 10,000 | 25 | LSP | 4 |
| 7 Fourth Fracturing Fluid | Linear gel - Proppant slurry | 15,000 | 25 | HSP | 3 |
| 8 Fourth Fracturing Fluid | Linear gel - Proppant slurry | 15,000 | 25* | HSP | 4 |

*The injection rate of injection stage 8 is designed to slow down and ramp up a number of times to appropriately squeeze the proppant slurry into the propped fracture.

An effective screenless frac pack is created by the method described above.

Therefore, the present compositions and methods are well adapted to attain the ends and advantages mentioned, as well as those that are inherent therein. The particular examples disclosed above are illustrative only, as the present treatment additives and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present treatment additives and methods. While compositions and methods are described in terms of "comprising," "containing," "having," or "including" various components or steps, the compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of treating a highly permeable subterranean formation that is penetrated by a wellbore to form a frac pack in the formation, comprising:
    (a) injecting a first fracturing fluid into the formation at a pressure sufficient to form a fracture in the formation that propagates from a near-wellbore region of the formation into a far-field region of the formation, wherein said first fracturing fluid is a high efficiency fracturing fluid, wherein said first fracturing fluid is formed into a high efficiency fracturing fluid by adding a fluid loss control agent to the first fracturing fluid, by adding a viscosifying agent to the first fracturing fluid, or both;
    (b) following step (a), injecting a second fracturing fluid that includes a high strength proppant into the formation at a pressure sufficient to keep said fracture open and place high strength proppant in a portion of said fracture in a near-wellbore region of the formation, wherein said second fracturing fluid is a low viscosity fracturing fluid;
    (c) following step (b), injecting a third fracturing fluid that includes a low strength proppant into the formation at a pressure sufficient to keep said fracture open and place low strength proppant in a portion of said fracture in a far-field region of the formation, wherein said third fracturing fluid is a low viscosity fracturing fluid; and
    (d) following step (c), injecting a fourth fracturing fluid that includes a high strength proppant into the formation at a pressure sufficient to keep said fracture open and squeeze high strength proppant into said portion of said fracture in which high strength proppant was placed by said second fracturing fluid, wherein said fourth fracturing fluid is a low viscosity fracturing fluid.

2. The method of claim 1, wherein said first fracturing fluid is a pad fracturing fluid.

3. The method of claim 1, wherein said second and fourth fracturing fluids are injected into the formation at a pressure sufficient to place high strength proppant in a portion of the fracture in a limited near-wellbore region of the formation, and said third fracturing fluid is injected into the formation at a pressure sufficient to place low strength proppant in a portion of the fracture in an expanded far-field region of the formation.

4. The method of claim 1, wherein the method is used to form a sand screen frac pack in the formation, the wellbore has an annular wall in a desired wellbore interval, and the method further comprises:
    prior to step (a), installing a sand screen in the desired wellbore interval, wherein said sand screen has an inside surface, an outside surface, and a size and shape such that an annulus is formed between said outside surface of said sand screen and the annular wall of the wellbore in the desired wellbore interval; and
    injecting a screen fracturing fluid that includes a proppant into the wellbore at a pressure sufficient to place proppant in said annulus between said outside surface of said sand screen and the annular inner wall of said wellbore in the desired wellbore interval, wherein said screen fracturing fluid is a low viscosity fracturing fluid.

5. The method of claim 4, wherein said second, third, fourth and screen fracturing fluids each have a viscosity in the range of about 3 centipoises to about 10 centipoises.

6. The method of claim 4, wherein each of said first, second, third, fourth and screen fracturing fluids includes an aqueous-based base fluid.

7. The method of claim 1, wherein said method is used to form a screenless frac pack in the formation, and wherein said high strength proppant placed and squeezed into the fracture by said second and fourth fracturing fluids, respectively, is coated with a consolidating agent.

8. The method of claim 1, wherein said high strength proppant has a crush resistance in the range of from 4,000 psi to about 25,000 psi.

9. The method of claim 1, wherein said high strength proppant is selected from the group of resin-coated sand, geopolymer-coated sand, composite proppant, ceramic proppant, steel balls, and combinations thereof.

10. The method of claim 1, wherein said low strength proppant has a crush resistance in the range of from about 1000 psi to 3,999 psi.

11. The method of claim 1, wherein said low strength proppant is selected from the group of natural sand, brown sand, local sand, white sand, glass beads, glass spheres, and combinations thereof.

12. The method of claim 1, wherein said low strength proppant comprises the majority of the total proppant placed in the fracture.

13. The method of claim 1, wherein when placed in said fracture, said low strength proppant extends over the majority of the length of the fracture.

14. The method of claim 1, further comprising, in connection with step (c), after said low strength proppant is placed in a portion of said fracture in a far-field region of the formation, reducing the injection rate at which the third fracturing fluid is injected into the formation in order to induce a tip screen out at the tip of the fracture in the far-field region of the formation.

15. The method of claim 1, wherein said high strength proppant in the fourth fracturing fluid has a particle size that is larger than the particle size of said low strength proppant.

16. The method of claim 1, further comprising injecting said fracturing fluids into said formation using pumping equipment.

17. A method of treating a highly permeable subterranean formation that is penetrated by a wellbore to form a sand screen frac pack in the formation, wherein the wellbore has an annular wall, comprising:
(a) installing a sand screen in a desired wellbore interval, wherein said sand screen has an inside surface, an outside surface, and a size and shape such that an annulus is formed between said outside surface of said sand screen and the annular wall of the wellbore in the desired wellbore interval; and
(b) following step (a), injecting a first fracturing fluid into the formation at a pressure sufficient to form a fracture in the formation that propagates from a near-wellbore region of the formation into a far-field region of the formation, wherein said first fracturing fluid is a high efficiency fracturing fluid, wherein said first fracturing fluid is formed into a high efficiency fracturing fluid by adding a fluid loss control agent to the first fracturing fluid, by adding a viscosifying agent to the first fracturing fluid, or both;
(c) following step (b), injecting a second fracturing fluid that includes a high strength proppant into the formation at a pressure sufficient to keep said fracture open and place high strength proppant in a portion of said fracture in a near-wellbore region of the formation, wherein said second fracturing fluid is a low viscosity fracturing fluid;
(d) following step (c), injecting a third fracturing fluid that includes a low strength proppant into the formation at a pressure sufficient to keep said fracture open and place low strength proppant in a portion of said fracture in a far-field region of the formation, wherein said third fracturing fluid is a low viscosity fracturing fluid;
(e) following step (d), injecting a fourth fracturing fluid that includes a high strength proppant into the formation at a pressure sufficient to keep said fracture open and squeeze high strength proppant into said portion of said fracture in which high strength proppant was placed by said second fracturing fluid, wherein said fourth fracturing fluid is a low viscosity fracturing fluid; and
following step (e), injecting a screen fracturing fluid that includes a proppant into the wellbore at a pressure sufficient to place proppant in said annulus between said outside surface of said sand screen and the annular wall of said wellbore in the desired wellbore interval, wherein said screen fracturing fluid is a low viscosity fracturing fluid.

18. The method of claim 17, further comprising, in connection with step (d), after said low strength proppant is placed in a portion of said fracture in a far-field region of the formation, reducing the injection rate at which the third fracturing fluid is injected into the formation in order to induce a tip screen out at the tip of the fracture in the far-field region of the formation.

19. A method of treating a highly permeable subterranean formation that is penetrated by a wellbore to form a frac pack in the formation, comprising:
(a) injecting a first fracturing fluid into the formation at a pressure sufficient to form a fracture in the formation that propagates from a near-wellbore region of the formation into a far-field region of the formation, wherein said first fracturing fluid is a high efficiency fracturing fluid, wherein said first fracturing fluid is formed into a high efficiency fracturing fluid by adding a fluid loss control agent to the first fracturing fluid, by adding a viscosifying agent to the first fracturing fluid, or both;
(b) following step (a), injecting a second fracturing fluid that includes a high strength proppant into the formation at a pressure sufficient to keep said fracture open and place the high strength proppant in a portion of said fracture in a near-wellbore region of the formation, wherein said second fracturing fluid is a low viscosity fracturing fluid;
(c) following step (b), injecting a third fracturing fluid that includes a low strength proppant into the formation at a pressure sufficient to keep said fracture open and place the low strength proppant in a portion of said fracture in a far-field region of the formation and, after said low strength proppant is placed in a portion of said fracture in a far-field region of the formation, reducing the injection rate at which the third fracturing fluid is injected into the formation in order to induce a tip screen out at the tip of the fracture in the far-field region of the formation, wherein said third fracturing fluid is a low viscosity fracturing fluid; and (d) following step (c), injecting a fourth fracturing fluid that includes a high strength proppant into the formation at a pressure sufficient to keep said fracture open and squeeze high strength proppant into said portion of said fracture in which high strength proppant was placed by said second fracturing fluid, wherein said fourth fracturing fluid is a low viscosity fracturing fluid.

\* \* \* \* \*